May 26, 1964   D. M. GOODMAN   3,134,975
RADAR DISPLAY FOR COLLISION WARNING DEVICE AND NAVIGATIONAL AID
Filed Dec. 30, 1960   3 Sheets-Sheet 1

INVENTOR.
DAVID M. GOODMAN
BY *Hane + Nydrele*

May 26, 1964  D. M. GOODMAN  3,134,975
RADAR DISPLAY FOR COLLISION WARNING DEVICE AND NAVIGATIONAL AID
Filed Dec. 30, 1960  3 Sheets-Sheet 2

INVENTOR.
DAVID M. GOODMAN
BY

United States Patent Office 3,134,975
Patented May 26, 1964

3,134,975
RADAR DISPLAY FOR COLLISION WARNING
DEVICE AND NAVIGATIONAL AID
David M. Goodman, 3843 Debra Court, Seaford, N.Y.
Filed Dec. 30, 1960, Ser. No. 85,950
9 Claims. (Cl. 343—11)

This invention relates to multi-dimensional display apparatus. In particular it is directed to an aircraft cockpit display where radar targets may be displayed in color, with different colors representing different target ranges. This invention will reduce the possibility of aircraft collisions in flight by warning the pilot of impending collision and by indicating to him evasive flight paths. It is also directed to instrument landing systems where the final approach phase is pilot controlled.

It will be shown that by combining a novel multi-color cathode ray tube with elementary timing circuits and with a few gating circuits it is possible to generate a display which will bring to the pilot (1) that information which will enable him to avoid mid-air collisions, and (2) that information which will enable him to make instrument landings. The basic information is derivable from radar of the type frequently installed on aircraft to obtain weather data.

The collision avoidance mode of operation comprises one of the principal objects of this invention and is achieved in the following manner: The radar transmitter is connected to an antenna housed in the nose or other suitable portion of the aircraft. The antenna generates a search-light type beam which scans the region in front of the aircraft. Radar pulses generated by the transmitter are reflected by targets in the search region, and are then detected in a microwave receiver. The received signals are identified in terms of their time of arrival. Signals received soon after the transmitted pulse are from nearby targets. Signals received long after the transmitted pulse are from distant targets. This information is presented to the pilot on a color cathode ray tube, or other suitable color display device. On the face of the display there is presented a gnomonic-like projection of objects in front of the aircraft. Those objects that are distant are presented in white; those that are close to the aircraft are presented in red; intermediate ranges are symbolized by different colors. As will be explained later in further detail this display enables the pilot to avoid collision.

The instrument landing system comprises another major objective of this invention and provides a color display useful to the pilot for landing his aircraft under poor visibility conditions. The landing information is derived from a scanning type transmitter-receiver. It may be the same radar set used for collision avoidance. In this case, special dipole or corner reflectors are installed along a runway so that the radar reflections therefrom outline the landing strip. The color pattern of the display furnishes the pilot with a preferred descent path for the aircraft as will be explained infra.

Another object of this invention is to provide forms of color displays which make it possible to speed up air traffic control by enabling information to be presented to the pilot in a rapid and readily distinguishable form.

The manner in which these objects are accomplished may be understood more readily by referring to the following description of operation taken in conjunction with the drawing, wherein.

Figure 1:
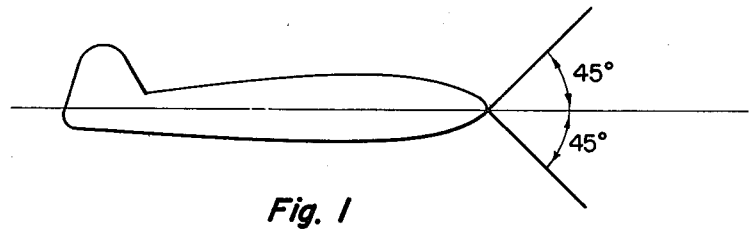
FIG. 1 illustrates an aircraft with a nose mounted antenna arranged to give coverage of a 90° solid angle in front of the aircraft.

The description of the invention is best given by way of a specific example. As shown by FIGURE 1 the region of space to be probed, and displayed, is that covered by a cone whose edges are at an angle of 45° to the longitudinal axis of the aircraft. This may be achieved by scanning the antenna beam in a spiral fashion symbolized in FIGURE 2. The "A" ring represents the straight-ahead line of sight position. It corresponds to the minimum radius of scan.

Figure 3:
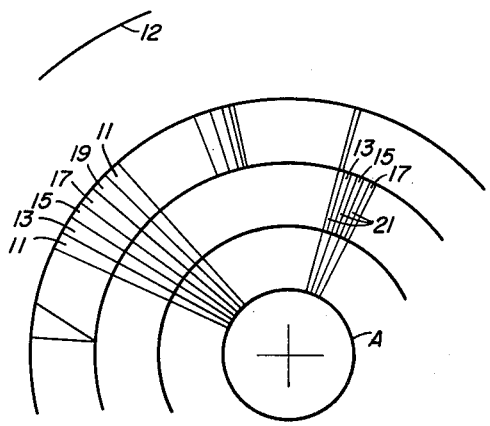
FIG. 3 illustrates phosphor patterns that may be used on the face of a cathode ray tube to present information to the pilot. The pattern is drawn out-of-scale for clarity in reading.

In FIGURE 3 the portion of the phosphor display pattern of the cathode ray tube which corresponds to the "A" ring has an inside diameter of 1 inch. This circle therefore has a 3 inch circumference. Assuming the cathode ray tube has an effective spot size of .010 inch, there may be deposited 300 lines of phosphor material each .010 inch at this "A" ring position. Some of these strips, and the wedges emanating therefrom, are shown as 11, 13, 15, 17, 19, 11 in FIGURE 3.

Figure 5:
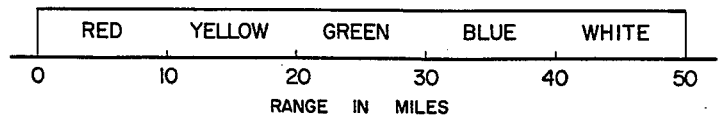
FIG. 5 illustrates a 50 mile target range separated into 5 ranges of 10 miles; each range designated by a different color.

In FIGURE 5 it is shown that the first 50 mile range is divided into 5 segments. Thus, each line-of-sight position of the antenna may have within its "searchlight" region 5 different types of range information. If the target is within 10 miles, the display is made to present a red target. From 10 to 20 miles the target display is yellow; from 20 to 30 miles the display is green; from 30 to 40 miles the display is blue; from 40 to 50 miles the display is white. With this display arrangement the pilot generally will see a target first as white, when it comes into radar range. If the target flies a closing course in a fixed line-of-sight position from the nose of the aircraft it will be plotted at a stationary position on the cathode ray tube. The color of the displayed target will indicate range, and rate of change of color will indicate range-rate. For a closing target with a varying line-of-sight position, the locus of the trace on the display corresponding to the locus of the line-of-sight position as seen from the nose of the aircraft will go from white, through blue, green, and yellow. If the target comes within 10 miles the display target becomes red.

The interpretation of the display by the pilot is as follows: Any object that shows up as a white target is observed by the pilot if the range of the object continues to close. This is indicated by a change in colors from white to blue, to green, to yellow to red. As a rule, the object will close at first, and then open in range. This receding target will be clearly shown since the color sequence will reverse. This target then is no longer of interest from the collision point of view and the pilot can turn his attention to other duties. On the other hand, if the range of the object continues to close, the color sequence will not reverse. The green, and more so the yellow, target should increase the apprehension of the pilot. A target displayed in the red indicates it is within danger range. Since the target is presented in a view corresponding to line-of-sight taken from the nose of the aircraft, the pilot will immediately know from which direction the collision object is closing, and he may therefore maneuver accordingly. Finally, if a direct collision is imminent, meaning the object is close in distance and directly in line of sight, the inner ring of the display will be illuminated in red. This red bull's-eye is the condition the pilot must avoid.

Figure 2:
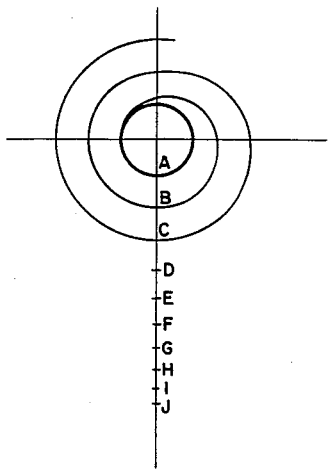
FIG. 2 illustrates a spiral scan pattern. The center of the display, corresponding to dead ahead bearing, is presented as a circular ring A.

Referring back to FIGURE 3, the inner ring has a 3 inch inner circumference, is divided into 300 strips, and contains 5 different color strips. The five strip group is repeated 60 times across the inner ring of the tube and fans out wedge-wise to the extremity of the collision display. See 11, 13, 15, 17, 19, 11, etc. An effective radar beam width of 6° covers the 360° of circular scan in 60 steps. To cover the 45° scan away from the reference line-of-sight requires 8 scans with a beam which covers 6° in the radial direction. To provide overlap the spiral scan illustrated in FIGURE 2 shows 10 scans designated A–J. If each 360° scan takes 1 second, a complete ten-scan spiral cycle requires 10 seconds, and the pilot has a complete picture presented to him 6 times per minute.

Figure 4:
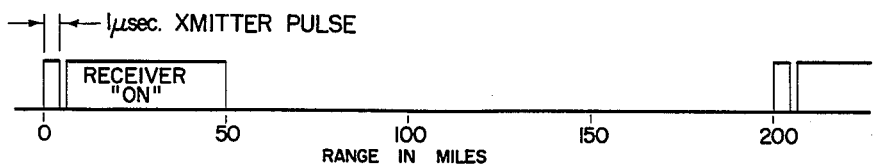
FIG. 4 illustrates the timing of a typical transmitter pulse, and the timing of the receiver circuits in terms of radar range.

In FIGURE 4 it is shown that a 1 $\mu$sec. pulse is transmitted. The signals reflected from targets in the path of the radar beam are detected in a suitable receiver. The output of the receiver is utilized for the first 50 miles of range as illustrated in FIGURE 4. For the next 150 miles, the receiver signal is discarded for purposes of this collision detector. It may be used however for a conventional PPI display and for that reason the pattern of FIGURE 3 may be extended as shown by outer ring 12 of FIGURE 3. Two hundred miles are equivalent roughtly to 400,000 yards, and using a velocity of 164 yards per $\mu$sec. as the effective speed of radar transmission and reflection, the time between successive transmitted pulses is set at approximately 2,400 $\mu$secs. For the first 600 $\mu$secs. after the transmitter pulse the target information is used for the collision detector.

Figure 6:
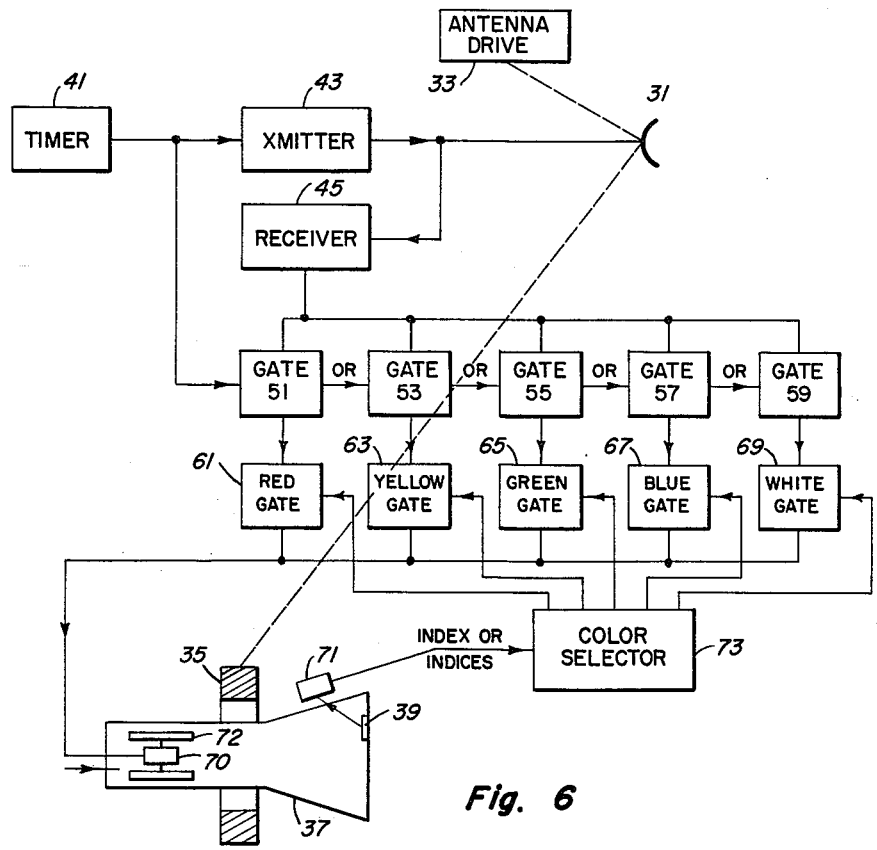
FIG. 6 illustrates the timing and gating circuits, in block form, that are connected between the transmitter-receiver and the color display device.

FIGURE 6 illustrates how this information is used. Spirally-scanned antenna 31 is shown driven by means 33. The radar beam position is transmitted to deflection coils 35 so that the spiral scan on the face 39 of cathode ray tube 37 conforms to that of the radar beam in space. The scan of the radar beam, and that of the electron beam, are represented in FIGURE 2. Timer 41 triggers transmitter 43 to furnish 1 $\mu$sec. radar pulses every 2,400 $\mu$secs. Simultaneously, timer 41 triggers gates 51, 53, 55, 57 and 59 so that each gate is open for 120 $\mu$secs., corresponding to a range of 10 miles for each gate. Gate 51 takes the output from receiver 45, and for the first 120 $\mu$secs. after the output radar pulse, passes this signal to red gate 61. The signal from this red gate 61 is synchronized to be transmitted to electron gun 70 of cathode ray tube 37 at the proper time. Likewise, for the period 120–240 $\mu$secs. after the trasnmitted pulse, the gate 53 is open. The output of gate 53 passes on to yellow 63; etc. Thus, gates 51, 53, 55, 57 and 59 code the signals received by 45, into 5 different target ranges and pass them into 5 different channels.

These coded signals are decoded by gates 61, 63, 65, 67 and 69 in combination with tube 37, target screen 39, index signal generator 71, and color selector 73. A more complete description of the cathode ray tube is contained in my U.S. Patent 2,915,659, and the references therein. Further information on this aspect of the invention also is contained in my co-pending application, Serial No. 800,854, filed March 20, 1959, now Patent No. 3,081,414. Briefly stated, what happens is this: One circular scan takes one second, as previously stated. The electron beam traverses 300 strips on the face 39 of the cathode ray tube during this one second period. Hence, the electron beam dwells on each strip 3,300 $\mu$secs. This period is greater than the 2,400 $\mu$secs. between radar pulses. When the electron beam dwells on a red strip, like strip 11 in FIGURE 3, it sends an index signal to means 71. A signal is generated thereby which operates through means 73 to open red gate 61. Hence, if a target is within the first 10 mile range, it will be passed through receiver 45 through gate 51, through gate 61 and through gun 70, to cause the electron beam of tube 37 to impinge upon red strip 11 on screen 39. The particular red strip, and the radial position thereon, which is excited correspond to the spatial position of the object in the radar beam. If, in this position of the beam, there is no target within 10 miles, there will be no output from gate 51, and no target is displayed on the cathode ray tube.

Let us suppose there is a target at a range of 45 miles. Since the radar return at this distance is in the time range 480–600 $\mu$secs. after the radar pulse, it will pass through gate 59, and will proceed to white gate 69. White gate 69 will be opened by color selector 73 so that when the electron beam is in a position on the tube corresponding to the position of the radar beam in space, the white strip 19 will be energized. This shows the pilot the direction in which there is a target at range 40–50 miles. He then watches it until the object recedes indicating a non-collision course. It can be seen from the preceeding example that 5 timed gates and 5 synchronized color gates were added to my special cathode ray tube, and then combined with a radar transmitter-receiver combination to achieve this result.

It should be appreciated that this example was submitted primarily for descriptive purposes. Clearly the invention is not restricted to these specific ranges, scan rates, spot sizes, etc. It should also be made clear that other color display devices may be used as part of this invention. However, the shadow-mask and post-acceleration deflection type color tubes do not provide the feedback signals that are used to gate the electron beam on and off, and index signal generating tubes of the secondary emissive variety, which do provide these feedback signals, do so with a time lag which reduces their effectiveness. The tube here described uses electro-magnetic radiation for the index signal. The generation and detection of these signals are efficient; the speed of transmission thereof is rapid. Therefore a simple structure and wide band-width are made possible.

In FIGURE 6, means 71 symbolize an externally positioned index signal detector; means 72 symbolize two different index signal detectors disposed within the cathode ray tube. One of these detectors may be used to synchronize electron gun 70; the other may be used to synchronize a second electron gun. Element 74 symbolizes the input to the second gun. The display screen of FIGURE 3 illustrates a number of ways in which the display may be extended. The strips 11, 13, 15, 17, and 19 may be interleaved with a different color producing phosphor 21; the resolution may be increased at the outer regions of the display by increasing the number of strips; the angles subtended by the various strips may be unequal; the center of ring "A" may be used to display a steering dot; etc.

Figure 7:
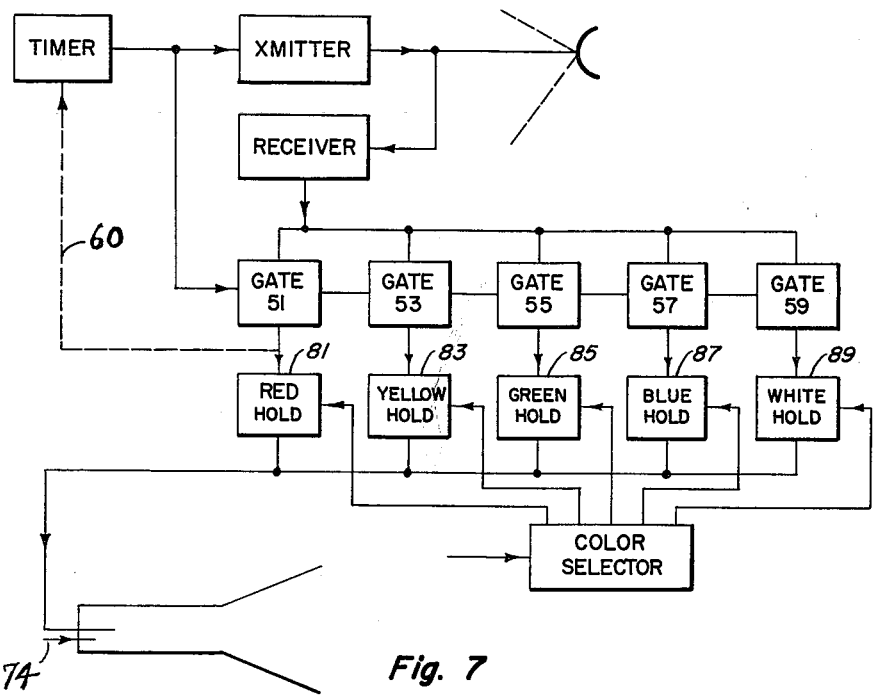
FIG. 7 illustrates a different embodiment of timing and gating circuits, together with holding or signal storage circuits which provides more definition and more information on the display device.

In FIGURE 7 a block diagram is presented which takes the aforesaid principles of this invention and combines them in a manner more readily enabling the collision warning display to be used also as the display for weather radar, altimeter data, steering data, fuel remaining, or such other information as should be presented to the pilot. This multiple display may be achieved by time-sharing the display for the various presentations or by using a plurality of electron guns in the cathode ray tube.

Referring to FIGURE 7, which is akin to FIGURE 6 and wherein like circuits have the same numeration, it is seen that the five gates 61, 63, 65, 67 and 69 of FIGURE 6 have been replaced by five holding, or integrating, circuits 81, 83, 85, 87 and 89. In this mode of operation, the received signals that are time coded by gates 51, 53, 55, 57 and 59 are accumulated and stored in the integrators 81, 83, 85, 87, 89, respectively. Thus, regardless of the position of the electron beam in cathode ray tube 37, when a target is in the 10 mile range it will reflect the transmitter pulse and the reflected signals will be stored in red-hold means 81. For the preceding example (of 300 strips, 60 groups of five-strips, a beam width of 6°, and a 360° scanning rate of once per second) the target will be in the beam for approximately 16,600 $\mu$secs. With the pulse repeating at 2,400 $\mu$secs., approximately 7 returns will be received per target. These seven signals are detected and then stored in means 81. When the electron beam of cathode ray tube 37 strikes the red strip 11 of FIGURE 3, an index signal will operate color selector 73 thereby sending the red-release signal to means 81. This causes the stored signal to modulate electron gun 70 in order to excite the red strip 11. Since the electron beam may happen to be on strip 11 when gate 51 is opened, the storage cycle should precede the release cycle. Detailed descriptions of storage circuits, gates, and timing means of this type are well known. A plurality of index signal generation and utilization means are disclosed in my above referenced patent and co-pending application. These circuit and tube details are not necessary here for a proper understanding of this invention and therefore are omitted.

The important thing to note from the description of operation of FIGURE 7 is that the display screen of the cathode ray tube 37 is energized in spurts. The information stored in means 81, 83, 85, 87 and 89 is released only when the beam is in its correct position. The dwell time previously noted was 3,300 $\mu$secs. Clearly, much less time than this is needed to energize the strips. The balance of the time may be used for the presentation of additional data. Also, since the receiver output is used in the collision mode for only the first 600 $\mu$secs. after the transmitter pulse, the remaining 1800 $\mu$secs. can be used for other purposes; e.g. to present weather data for the range 50–200 miles. Thus the conventional weather radar disply can be combined with the collision warning device.

The preceding system will be described now as it may be used for an instrument landing display. The spiral scan drive mechanism is modified to produce a rectangular scanning pattern. The vertical scan is made to be more rapid than the horizontal scan to produce in space, and on the cathode ray tube display, a vertical raster pattern. The line-of-sight view along the aircraft's longitudinal axis corresponds to the center point of the display. This point is analogous to the bull's-eye of the previous display. The different color producing phosphor strips are positioned horizontally on the face of the cathode ray tube. The region of space that will be probed, and displayed, corresponds to that lying within a rectangular projection. A change is made also in the time duration of the transmitted pulse. It is now set at 0.1 $\mu$sec., yielding a minimum range in the order of 17 yards. As may be seen from FIGURE 9, a slant range of 17 yards, represented by $R_3$, corresponds to an altitude above ground of only a few yards. Therefore this pulse width can be used quite successfully for the landing configuration.

Figures 8, 10:
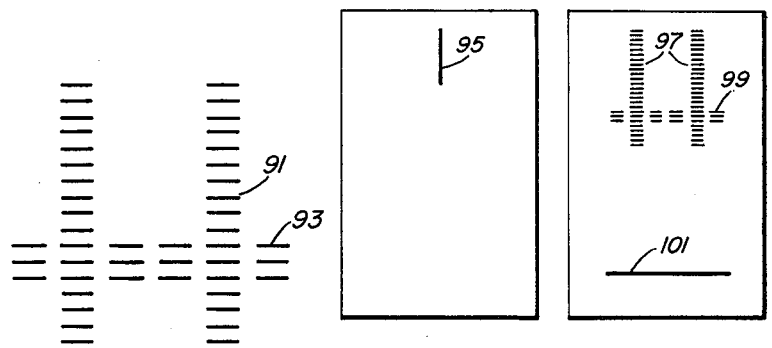
FIG. 8 illustrates dipole reflectors, or corner reflectors, positioned along a landing strip.
FIG. 10 illustrates a typical view on the radar display during descent of the aircraft to the landing strip.

Referring now to FIGURE 8, a landing strip is depicted where radar reflectors 91 outline the runway. These reflectors are designed to reflect efficiently the particular frequency band assigned to the radar sets. Horizontally disposed dipoles, spaced apart, and placed perpendicular to the runway will work well in conjunction with an airborne antenna system which generates a horizontally polarized radar beam. There is an area 93 in the pattern which is used to indicate where "touch-down" should be made.

Figure 9:
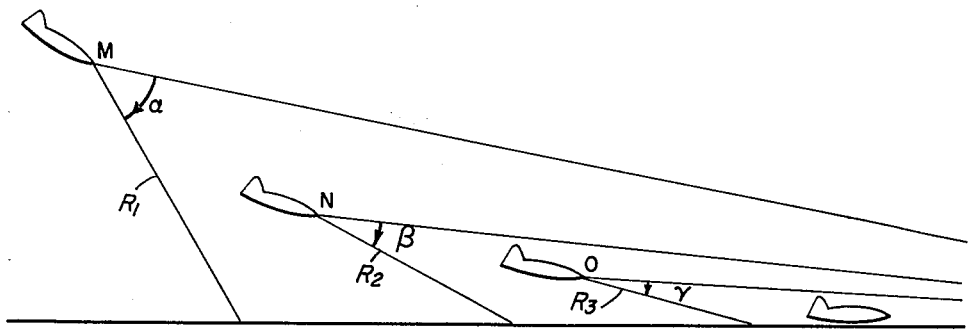
FIG. 9 illustrates a typical landing situation.

In FIGURE 9 a typical landing approach is shown.

The scan of the radar beam in the horizontal direction covers the landing strip of FIGURE 8. The display corresponding to this mode of scan is illustrated in FIGURE 10. The reflectors show more or less as a vertical line 95 when the aircraft is at a considerable distance from the runway. As approach is made the pattern expands and both sides of the strip are shown as at 97 and the touchdown signal as at 99 of FIGURE 10. The aircraft is brought to point M in FIGURE 9 by ground control or other navigational systems. At this point M, the reflections from the ground within the scan of the radar that are returned with minimum time delay are at a distance $R_1$. The bottom of the pilot's display, position 101 in FIGURE 10, will show the color that corresponds to this distance, or range. The pilot also will see the balance of his display in which the top of his rectangular screen shows the runway. The object of his descent is to bring the area 99 of his screen, as seen in FIGURE 10, into a red display; to do so at a uniform rate; and to have it coincide, when red, with position 101 at the bottom of the display.

To assist the pilot in this landing maneuver, it is desirable to expand the display to obtain more detail as he approaches the runway. This may be achieved by reducing the angle of vertical scan of the antenna. This condition is represented by the change in angles $\alpha$, $\beta$, and $\gamma$ of FIGURE 9. However, just before touch-down where the range $R_3$ may be in the order of 20 yards, the entire screen of FIGURE 10 would be in a red display if the 10 mile gates of FIGURE 5 were used. This is avoided by making a change in timer 41 and the duration of gates 51, 53, 55, 57, and 59 of FIGURE 7. In the landing configuration the gates can be set at one mile each for the start of the descent. When point M of FIGURE 9 is reached, and for this explanation assume distance $R_1$ is then one mile, the bottom of the display turns red. Under these conditions signals appear at the output of gate 51. Via path 60, shown in FIGURE 7, the output from the short range gate 51 operates on timer 41 (or alternatively the output from 51 acts on gates 51, 53, 55, 57 and 59), so that the gate times are reduced to correspond to 0.2 mile intervals, roughly 330 yards. The next automatic shift in scale results in 70 yard increments; the next shift in scale results in 17 yard increments. This is the display used for touch-down. The top of the rectangle should be white; the bottom red. The blue, green, and yellow regions complete the transition.

There is sufficient flexibility in designing the timing and gating circuits so that almost any desired ranges and group of ranges can be utilized. The five range gates may be increased in number, their durations may be different, and the last gate may remain open. Also, means may be provided for reducing the pulse width of the transmitted radar signal, and the output power thereof, in order to obtain better resolution of the ground targets at small ranges. As with the change in range gates, these reductions in pulse width and output power, and the change in angle of scan, may be responsive to signals in the output of gate 51. It is also to be noted that these considerations, including the rectangular scan, may be applied to the collision warning mode of operation.

In summary then, it may be seen that the teachings of this invention provide means for avoiding collisions in the air and for landing aircraft during foul weather. The collision avoidance display should be implemented immediately since it functions in a manner compatible with existing operational procedures and since it provides urgently needed navigational assistance not presently available. The instrument landing display, while perhaps not so badly needed, should be implemented since the same basic equipment can provide this display and additionally for the reason that the landing system, being airborne, will work and may be needed during emergencies when the ground landing systems are inoperative.

Having thus described my invention, and some of the uses to which it can be put, I claim:

1. A multi-color display apparatus comprising in combination: first means for propagating a beam of energy, second means for scanning said beam of energy to irradiate distant objects, third means to detect return signals from the distant objects and to provide signals in different channels representing different ranges of said objects, fourth means for storing the signals in each of the different channels, a display means, fifth means for scanning the display means in synchronism with the scanning of the beam of energy, and sixth means for releasing the stored signals to modulate said display means so that the objects represented on the display appear with a color which is a function of their range.

2. An apparatus in accordance with claim 1 wherein said display means comprises a cathode ray tube with a multi-color target screen and with an electromagnetic radiation type beam indexing mechanism for indicating the position of the cathode rays on said target screen.

3. An apparatus in accordance with claim 1 wherein said display means comprises a cathode ray tube having a target screen containing radial strip-like portions adapted to furnish the visible display in different colors and wherein said second and fifth means generate a spiral scanning action which causes ahe cathode rays to traverse the radial strips approximately at right angles thereto.

4. A multi-color display apparatus comprising in combination: first means for propagating a beam of energy, second means for scanning said beam of energy in a spiral pattern to irradiate distant objects, third means to detect return signals from the distant objects and to provide signals in different channels representing different ranges of said objects, fourth means for storing the signals in each of the different channels, a display means, fifth means for scanning the display means in synchronism with the spiral scanning of the beam of energy, sixth means for releasing the stored signals to modulate said display means so that the objects represented on the display appear with a color which is a function of their range, and wherein the scanning provided by said fifth means leaves unscanned a central area of the display means.

5. An apparatus in accordance with claim 4 including additional means for modulating the previously unscanned central area of the display means in order to provide additional data for viewing.

6. A multi-color display apparatus comprising in combination: a radar transmitter for propagating a beam of energy, antenna means for scanning said beam of energy to irradiate distant objects, a radar receiver to detect return signals from the distant objects and to provide signals in different channels representing different ranges of said objects, means for storing the signals in each of the different channels, a display means, means for scanning the display means in synchronism with the scanning of the beam of energy, and means for releasing the stored signals to modulate said display means so that the objects represented on the display appear with a color which is a function of their range.

7. In combination: a radar transmitter, means for focussing into a beam the pulsed output of the radar transmitter, means for scanning said focussed beam, means for detecting the signals reflected by objects in the path of said beam, timing means that separate the thus-detected signals into channels $n_1$, $n_2$, $n_3$, . . . wherein detected signals received during period $t_1$ after an output pulse are routed through channel $n_1$, those signals received during period $t_2$ after said output pulse are routed through channel $n_2$, etc., means for storing and integrating each of the signals in channels $n_1$, $n_2$, $n_3$, . . . and means for displaying the stored and integrated signals so that the signal in channel $n_1$ appears in color $c_1$; the signal in channel $n_2$ appears in color $c_2$, etc.

8. The combination of claim 7 including means for releasing the thus integrated information whereby the intensity of the display of a target is made proportional to the magnitude of the integrated signal.

9. The combination of claim 7 including timing and gating means to release the stored information in a period of time that is short compared to the period of storage.

References Cited in the file of this patent

UNITED STATES PATENTS

| | | |
|---|---|---|
| 2,751,089 | Haeff | Aug. 28, 1956 |
| 2,780,805 | Gutton | Feb. 5, 1957 |